UNITED STATES PATENT OFFICE.

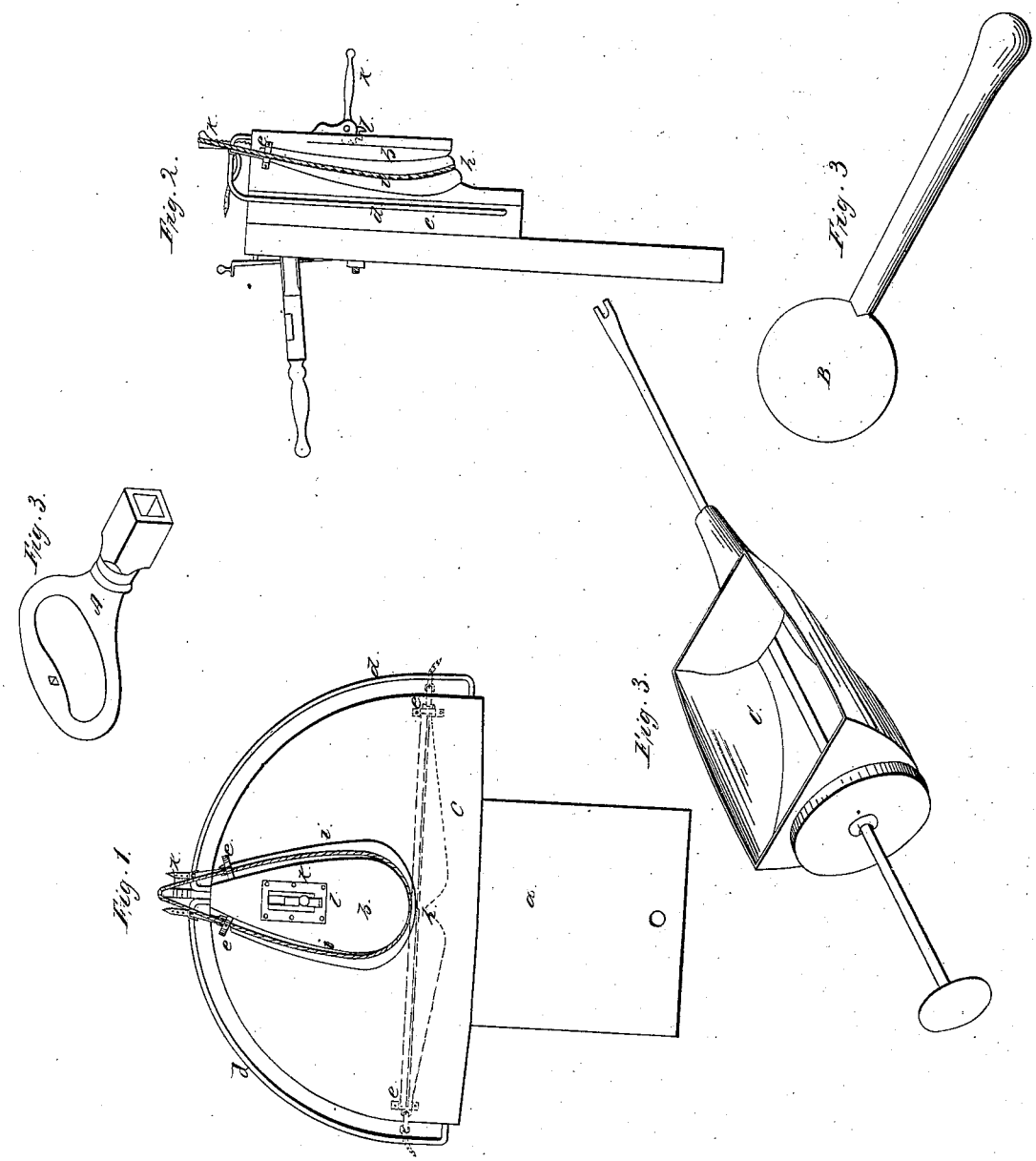

WADE HAWORTH, OF NEW YORK, N. Y.

MACHINE FOR STUFFING HORSE-COLLARS.

Specification of Letters Patent No. 5,177, dated June 26, 1847.

*To all whom it may concern:*

Be it known that I, WADE HAWORTH, of the city, county, and State of New York, have invented new and useful Improvements in Machines for Stuffing Horse-Collars, and that the following is a full, clear, and exact description of the principle or character which distinguishes it from all other things before known and of the manner of making, constructing, and using the same, reference being had to the accompanying drawings, making part of this specification, in which—

Figure 1 is a horizontal projection of the machine, and Fig. 2, a side elevation of the same, and Fig. 3, a view of the tools used in the operation of stuffing consisting of a key A hammer B and hopper C which as they are well known need no description.

The same letters indicate like parts in all the figures.

The nature of my improvement consists in an apparatus by which the collar can be stuffed, crooked around the block or former on which it is shaped. To effect this I combine the stuffing apparatus and former together as is shown in the drawing. On an inclined table (*a*) supported on two legs at the elevated end and resting the other end on the ground, is placed a revolving stuffing board (*c*) of semi-circular form which is attached to the elevated end of the table by a single bolt around which it turns; on this revolving board a block (*b*) of proper shape for the collar to be made is affixed. Around the edge of the board (*c*) on each side of the block there is a stout rod (*d*) a little elevated above the block and standing off from its edge, being supported at each end by being turned at right angles and driven into the board as clearly shown in the drawing; where these rods meet at the upper end of the block they curve upward so that their extreme ends are perpendicular. On these rods two clamps (*e*) are fastened so as to slide their whole length these parts form the stuffing apparatus. The collar is made of any suitable material in the ordinary way, and is stretched across the board below the block, its two ends being held in the clamps above named, which are slipped down to the broadest part for that purpose as shown by the red lines in Fig. 1 where the part (*h*) is stuffed at the bend of the collar, and the clamps are then slipped up a little bringing the collar up around the block gradually into place as the stuffing progresses; after the bend is passed the clamps are brought up together as is shown in the drawing and the straight part is finished in this way the collar is made more perfect and is stuffed crooked without the ordinary process of bending into shape which is so difficult to attain in practice without wrinkling, by which fine collars can be made much more perfect and much cheaper than in other way now practiced.

After the collar is stuffed a cord (*i*) is put around as is usual in blocking collars and is strained up by means of a jack rod (*k*) that is projected from the upper end of the block by means of a small toothed segment rack (*l*) that works into a rack as shown in the drawing formed on the jack rod (*k*) said segment being moved by a handle (*k′*) projecting up from the top of the block which finishes the operation.

Having thus fully described my improvements, what I claim as my invention and desire to secure by Letters Patent is—

The combination of the block and stuffing apparatus consisting of the stuffing board, rods (*d*) and clamps or other analogous device by which the collar can be stuffed and formed into shape around the block at the same time, substantially in the manner and for the purpose set forth, the whole operation of stuffing and forming being completed in one machine, as described.

WADE HAWORTH.

Witnesses:
A. P. BROWNE,
CHS. M. KELLER.